UNITED STATES PATENT OFFICE.

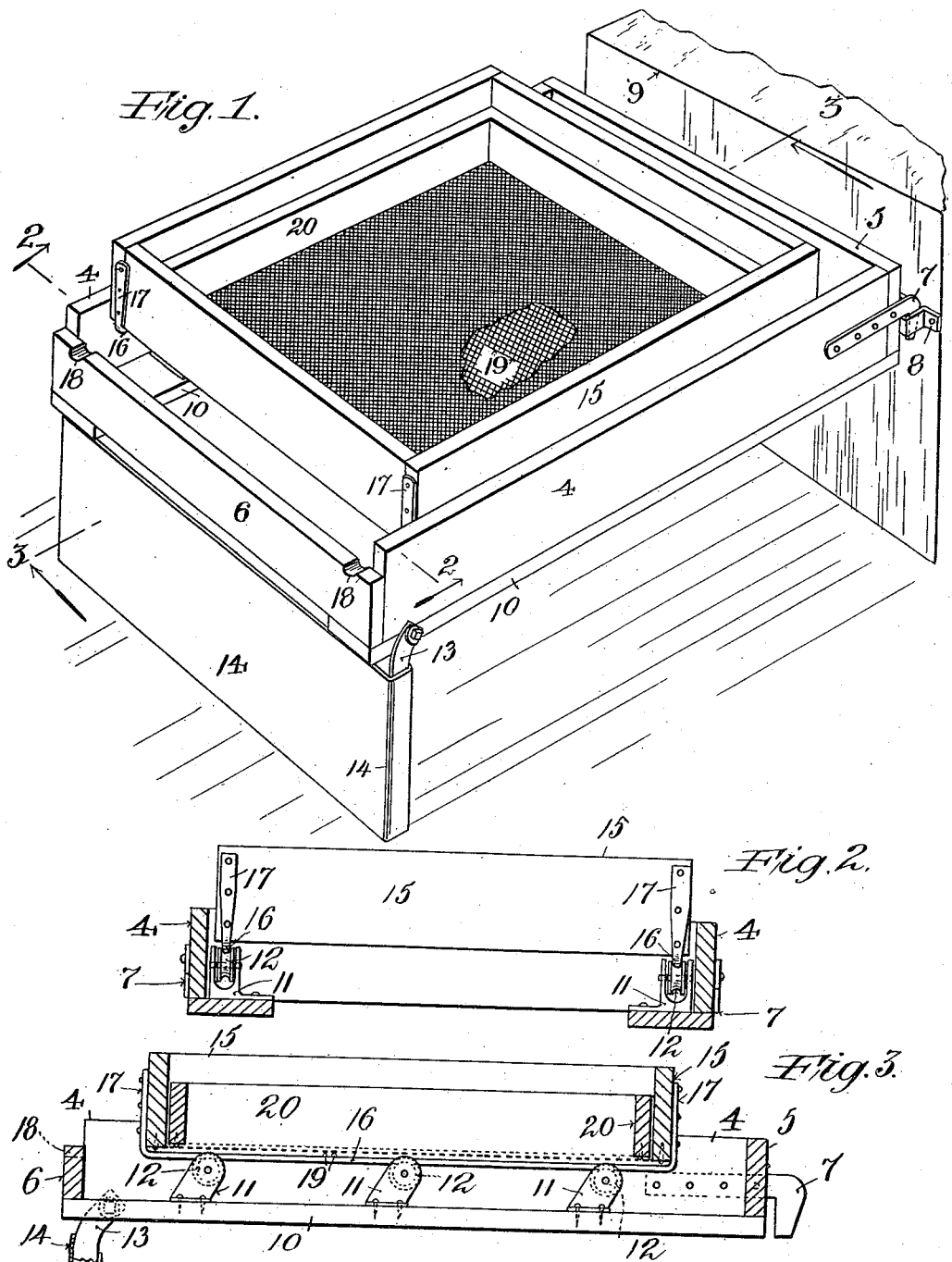

LOUIS MILLIOT, OF YONKERS, NEW YORK.

FLORIST'S DIRT-SIEVE.

1,132,667. Specification of Letters Patent. Patented Mar. 23, 1915.

Application filed June 16, 1910. Serial No. 567,144.

*To all whom it may concern:*

Be it known that I, LOUIS MILLIOT, a citizen of the United States, residing at Yonkers, county of Westchester, State of New York, have made a certain new and useful Invention in Florists' Dirt-Sieves, of which the following is a specification.

This invention relates to florists' dirt sieves.

The object of the invention is to provide a dirt sieve for florists' use which is simple in construction, and efficient in operation, and whereby the dirt required for potting, growing or propagating plants, flowers, shrubs, or the like may be separated from lumps, clods, stones or other undesirable constituents, and put in desirable condition for use, in a simple, effective and expeditious manner.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claim.

In the drawing,—Figure 1 is a view in perspective, parts broken out of a florist's dirt sieve embodying the principles of my invention. Figs. 2 and 3, are sectional views respectively taken on the lines 2, 2, and 3, 3, Fig. 1.

The same part is designated by the same reference sign wherever it occurs.

In the operation of potting, planting and bedding plants, flowers, shrubs and the like, it is desirable to employ dirt or soil which is free from clods, lumps, stones, etc., and into the mass of which any fertilizing agent employed is thoroughly mixed. Heretofore florists have employed inclined screens, permanently erected, onto which the dirt has been shoveled for the purpose of sifting the same. Many practical disadvantages are encountered in this operation. In the first place no opportunity is afforded for breaking up of clods or lumps which may contain rich and usable soil or dirt. Again, it is necessary after the screening operation to carry the pots, baskets or the like to be filled to the place where the permanently erected screen is located, or else to transport the screened dirt and soil from the screen to the point where the same is to be used, thus entailing additional labor and toil. Moreover ordinarily a screen of a permanent mesh is ordinarily employed, whereas it frequently is desirable in nurseries to use dirt or soil which has been screened to different degrees of fineness to suit different kinds of plants or flowers.

It is among the special purposes of my present invention to provide a florist's sieve which is portable, easily placed in position for use, and therefore capable of being carried from one point to another. I also provide means for applying the sieve to a bench or table on which the pots, baskets or the like are placed ready to be filled. I also provide means whereby the dirt or soil may be screened through different sizes of mesh and also I propose to arrange the screens to be operated horizontally or in inclined position if desired, and by hand so that the operator can manually break up any clods or lumps.

In carrying out my invention I provide a framework comprising side pieces 4 connected together at one end by the cross piece 5 and at the other end by a cross piece 6, the latter being of less width than the end cross piece 5 or the side bars 4 as clearly shown in Figs. 1 and 3. The side bars 4 are provided with hooks 7 suitably secured thereto at the rear ends thereof adapted to be hooked into hasps or socket pieces 8, see Fig. 1, the latter being secured to a table, bench or other convenient support 9. Secured to the under edges of the side bars 4 are stringer pieces 10, extending from end to end of the framework and upon these stringer pieces are mounted brackets 11 carrying rollers 12 indicated in dotted lines in Fig. 3. At the front ends of the side bars 4 are pivotally connected arms 13 carrying an apron 14 serving as a support for the front end of the framework, the framework being supported at its rear end by the hooks 7 engaging in the socket pieces 8. The screen indicated generally by reference numeral 15 is of rectangular shape and fitted to move freely endwise between the side bars 4. This screen frame is provided with strap rods 16 at each side edge thereof and extending lengthwise from end to end of the screen frame along the bottom thereof, the ends 17 of said strap rods being turned upwardly and secured respectively, to the end bars of the screen frame 15. These strap rods 16 rest upon the rollers 12, thereby facilitating the reciprocatory movements of the screen frame endwise back and forth in the supporting frame. The upper edge of the end piece 6 is scored or grooved as indicated at 18 so as to accommodate the strap rods 16 when it is desired to draw said screen lengthwise from between the side bars 4. The end piece numbered 6 terminates at its upper edge approximately in the plane of the upper portions of the supporting rollers 12, while the cross bar 5 at the other end of the frame extends to a greater height thereby forming a stop against which the rear end of the movable screen frame may abut during the shaking movements thereof.

In addition to the screen frame 15 which is provided with a mesh 19 of a given size I am enabled to secure a finer screening mesh by employing a supplemental screen 20 of finer mesh and placing the same within the screen frame 15. This supplemental screen is readily removable and may be replaced by another supplemental screen of somewhat or still finer mesh, thus enabling me to secure any desired degree of fineness in the screenings.

In the operation of the device the operator stands at the front end of the frame and moves the screen frame 15 back and forth endwise by hand. In case any clods or lumps are developed the operator can readily crush them by hand without interfering with the screening operation thereby utilizing the available material contained in such lumps or clods.

By varying the point of attachment of the socket pieces 8 to the table, wall, bench or other support 9, with reference to the height thereof I am enabled to secure any desired range of inclination of the screen.

Having now set forth the object and nature of my invention what I claim as new and useful and of my own invention and desire to secure by Letters Patent is,—

A florist's dirt screen comprising a main frame with side bars and end pieces, hook supports for one end of said side bars, a pivoted support for the other end of said side bars, a screen frame adapted to be received between said side bars to reciprocate back and forth therebetween, said end pieces being constructed so that the rear end piece extends to a greater height than the front end piece, brackets mounted on the inner sides of said side bars and carrying rollers, said rollers terminating at a height in the line of the upper edge of the front end piece, said screen frame having track straps connected to the under side of the side edges thereof and resting and operating upon said rollers when said screen frame is reciprocated back and forth between said side bars.

In testimony whereof I have hereunto set my hand in the presence of the subscribing witnesses, on this ninth day of June A. D. 1910.

LOUIS MILLIOT.

Witnesses:
CLARENCE H. REIN,
F. C. WHITE.

Copies of this patent may be obtained for five cents each, by addressing the "Commissioner of Patents, Washington, D. C."